US007473040B2

(12) United States Patent
Kenoyer et al.

(10) Patent No.: US 7,473,040 B2
(45) Date of Patent: Jan. 6, 2009

(54) HIGH DEFINITION CAMERA PAN TILT MECHANISM

(75) Inventors: Michael L. Kenoyer, Austin, TX (US); William V. Oxford, Austin, TX (US); Patrick D. Vanderwilt, Austin, TX (US); Hans-Christoph Haenlein, San Jose, CA (US); Branko Lukic, Menlo Park, CA (US); Jonathan I. Kaplan, Palo Alto, CA (US)

(73) Assignee: LifeSize Communications, Inc., Austin, TX (US)

( * ) Notice: Subject to any disclaimer, the term of this patent is extended or adjusted under 35 U.S.C. 154(b) by 448 days.

(21) Appl. No.: 11/251,083

(22) Filed: Oct. 14, 2005

(65) Prior Publication Data

US 2006/0104633 A1    May 18, 2006

Related U.S. Application Data

(60) Provisional application No. 60/619,227, filed on Oct. 15, 2004, provisional application No. 60/675,964, filed on Apr. 29, 2005, provisional application No. 60/675,966, filed on Apr. 29, 2005.

(51) Int. Cl.
*G03B 17/00* (2006.01)
(52) U.S. Cl. ...................................... 396/428; 348/169
(58) Field of Classification Search ................. 396/427; 348/14.08, 14.09, 143; 352/69
See application file for complete search history.

(56) References Cited

U.S. PATENT DOCUMENTS 4,264,928 A * 4/1981 Schober ...................... 348/169

| 5,034,947 A | 7/1991 | Epps |
| 5,054,021 A | 10/1991 | Epps |

(Continued)

FOREIGN PATENT DOCUMENTS

JP    2000197151    7/2000

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner*—Christopher E Mahoney
*Assistant Examiner*—Autumn Parker
(74) *Attorney, Agent, or Firm*—Meyertons Hood Kivlin Kowert & Goetzel, P.C.; Jeffrey C. Hood

(57) ABSTRACT

In various embodiments, a High Definition (HD) camera may be controlled by one or more motors in a base of the HD camera. Cables and other components may be used to manipulate the camera lens through the side arms of the HD camera. Putting the motors in the base may reduce the size of the outer case of the HD camera and add stability. In some embodiments, images from the HD camera may be converted into a serialized stream and transported over a cable from the lens through a center shaft of the HD camera. Other components may also be used to increase the functionality of the HD camera. In some embodiments, a camera support mechanism may be provided to couple a camera to a display. The camera support mechanism may include a front lip and rear leg to hold camera in place.

17 Claims, 7 Drawing Sheets

U.S. PATENT DOCUMENTS

| | | | |
|---|---|---|---|
| 5,374,971 | A | 12/1994 | Clapp et al. |
| 5,486,853 | A | 1/1996 | Baxter et al. |
| 5,515,099 | A | 5/1996 | Cortjens et al. |
| 5,528,289 | A | 6/1996 | Cortjens et al. |
| 5,537,157 | A * | 7/1996 | Washino et al. ............. 348/722 |
| 5,598,209 | A | 1/1997 | Cortjens et al. |
| 5,612,733 | A | 3/1997 | Flohr |
| 5,617,539 | A | 4/1997 | Ludwig et al. |
| 5,633,681 | A | 5/1997 | Baxter et al. |
| 5,657,096 | A | 8/1997 | Lukacs |
| 5,689,641 | A | 11/1997 | Ludwig et al. |
| 5,692,159 | A * | 11/1997 | Shand ......................... 703/27 |
| 5,737,011 | A | 4/1998 | Lukacs |
| 5,737,431 | A | 4/1998 | Brandstein et al. |
| 5,751,338 | A | 5/1998 | Ludwig, Jr. |
| 5,764,277 | A | 6/1998 | Loui et al. |
| 5,821,987 | A | 10/1998 | Larson |
| 5,896,128 | A | 4/1999 | Boyer |
| 6,072,522 | A | 6/2000 | Ippolito et al. |
| 6,124,892 | A | 9/2000 | Nakano |
| 6,356,308 | B1 | 3/2002 | Hovanky |
| 6,587,823 | B1 | 7/2003 | Kang et al. |
| 6,590,604 | B1 | 7/2003 | Tucker et al. |
| 6,593,956 | B1 | 7/2003 | Potts et al. |
| 6,594,688 | B2 | 7/2003 | Ludwig et al. |
| 6,643,462 | B2 | 11/2003 | Harand et al. |
| 6,724,619 | B2 | 4/2004 | Kwong et al. |
| 6,731,334 | B1 | 5/2004 | Maeng et al. |
| 6,809,358 | B2 | 10/2004 | Hsieh et al. |
| 6,816,904 | B1 | 11/2004 | Ludwig et al. |
| 6,822,507 | B2 | 11/2004 | Buchele |
| 6,850,265 | B1 | 2/2005 | Strubbe et al. |
| 6,912,178 | B2 | 6/2005 | Chu et al. |
| D510,589 | S | 10/2005 | Andre et al. |
| 6,980,485 | B2 | 12/2005 | McCaskill |
| 7,012,630 | B2 | 3/2006 | Curry et al. |
| 7,038,709 | B1 * | 5/2006 | Verghese .................... 348/169 |
| 7,046,295 | B2 | 5/2006 | Hovanky |
| 7,130,428 | B2 | 10/2006 | Hirai et al. |
| 7,202,904 | B2 | 4/2007 | Wei |
| 7,339,605 | B2 | 3/2008 | Rodman et al. |
| 7,397,495 | B2 | 7/2008 | Girish et al. |
| 2003/0103770 | A1 * | 6/2003 | Arbuckle .................... 396/427 |
| 2004/0001137 | A1 | 1/2004 | Cutler et al. |
| 2004/0183897 | A1 | 9/2004 | Kenoyer et al. |
| 2004/0257432 | A1 | 12/2004 | Girish et al. |
| 2005/0212908 | A1 | 9/2005 | Rodman et al. |
| 2005/0262201 | A1 | 11/2005 | Rudolph et al. |
| 2006/0013416 | A1 | 1/2006 | Truong et al |
| 2006/0034469 | A1 | 2/2006 | Tamiya et al. |
| 2006/0082655 | A1 | 4/2006 | Vanderwilt et al. |
| 2006/0104458 | A1 | 5/2006 | Kenoyer et al. |
| 2006/0165242 | A1 | 7/2006 | Miki et al. |
| 2006/0238611 | A1 | 10/2006 | Kenoyer et al. |
| 2006/0256983 | A1 | 11/2006 | Kenoyer et al. |
| 2006/0269278 | A1 | 11/2006 | Kenoyer et al. |
| 2007/0053681 | A1 * | 3/2007 | Arbuckle .................... 396/427 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Peter Meyers; "Adding Eye Contact to Your Web Chats"; The New York Times; Sep. 4, 2003; 5 pages.

"Polycom Executive Collection"; Jun. 2003; 4 pages; Polycom, Inc.; Pleasanton, CA.

Office Action of May 14, 2008, in U.S. Appl. No. 11/119,584, 17 pages.

Machine translation of JP 2000197151, 11 pages. Jul. 14, 2000.

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages (reference states last updated Feb. 3, 2004).

Peter Klein; "Video Workplace Conference"; IEEE Proceedings of Globecom; 1985 (month unknown); pp. 109-112; Siemens AG, Germany.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

C. M. Tan, P. Fletcher, M. A. Beach, A. R. Nix, M. Landmann and R. S. Thoma; "On the Application of Circular Arrays in Direction Finding Part I: Investigation into the estimation algorithms"; 1st Annual COST 273 Workshop, May/Jun. 2002; 8 pages.

Ivan Tashev; "Microsoft Array project in MSR: approach and results"; http://research.microsoft.com/users/ivantash/Documents/MicArraysInMSR.pdf; Jun. 2004; 49 pages.

"Press Releases"; Retrieved from the Internet: http://www.acousticmagic.com/press/; Mar. 14, 2003-Jun. 12, 2006; 18 pages; Acoustic Magic.

Marc Gayer, Markus Lohwasser and Manfred Lutzky; "Implementing MPEG Advanced Audio Coding and Layer-3 encoders on 32-bit and 16-bit fixed-point processors"; Jun. 25, 2004; 7 pages; Revision 1.11; Fraunhofer Institute for Integrated Circuits IIS; Erlangen, Germany.

* cited by examiner

HIGH DEFINITION CAMERA PAN TILT MECHANISM

PRIORITY CLAIM

This application claims priority to U.S. Provisional Patent Application serial No. 60/619,227 titled "High Definition Camera and Mount", which was filed Oct. 15, 2004, whose inventors are Michael L. Kenoyer, Patrick D. Vanderwilt, Paul D. Frey, Paul Leslie Howard, Jonathan I. Kaplan, and Branko Lukic which is hereby incorporated by reference in its entirety as though fully and completely set forth herein.

This application also claims priority to U.S. Provisional Patent Application serial No. 60/675,964 titled "Camera Support Mechanism", which was filed Apr. 29, 2005, whose inventors are Michael L. Kenoyer, Patrick D. Vanderwilt, Paul D. Frey, Paul Leslie Howard, Jonathan I. Kaplan, and Branko Lukic which is hereby incorporated by reference in its entirety as though fully and completely set forth herein.

This application further claims priority to U.S. Provisional Patent Application serial No. 60,675,966 titled "Camera Pan/Tilt Mechanism", which was filed Apr. 29, 2005, whose inventors are Michael L. Kenoyer, Patrick D. Vanderwilt, Paul D. Frey, Paul Leslie Howard, Jonathan I. Kaplan, and Branko Lukic which is hereby incorporated by reference in its entirety as though fully and completely set forth herein.

BACKGROUND OF THE INVENTION

1. Field of the Invention

The present invention relates generally to cameras and, more specifically, to video camera pan tilt mechanisms.

2. Description of the Related Art

Video conferencing systems may use cameras to capture images of conference participants at one site to transmit and display to conference participants at another site. While high definition (HD) cameras may be used to provide high definition images, they may be too large and too difficult to control for a video conferencing system. For example, it may not be possible to place a HD camera on top of a computer monitor as part of a conference system.

Traditionally, a tilt motor on the HD camera may be used in a rotating head of the HD camera structure and coupled to a lens/sensor assembly on the HD camera. A panning mechanism on the HD camera may need to overcome inertia of not only the lens/sensor assembly, but also the inertia of the tilt motor and linkage in the rotating head of the HD camera. In addition, traditional HD cameras may use thick cables to send analog signals (which may be susceptible to noise).

Video conferencing systems have traditionally been of the set-top box format. Examples are the Polycom ViewStation and Tandberg 880. These may be in the range of 13-17" wide by 8-10" deep and 6-10" high. They may be placed on the top of cathode ray tube (CRT) based televisions so the camera is above the display device showing the remote participants during a video call.

As large screen (32"-65") HiDef televisions have become more popular, the television industry has been transitioning away from CRT based devices and moving toward plasma and liquid crystal displays (LCD) screens, which allow the display to be much thinner. Current plasma and LCD televisions may be as thin as 3-4". This means the display may no longer have a set-top on which to place a video conferencing system. The camera of a video conferencing system may need to be as close to the display as possible in order optimize eye contact. However, displays may not be thick enough or flat enough to hold traditional set-top box video conferencing systems.

The top surfaces of the displays may also not have a consistent shape or depth making it very difficult to place a camera on top of the display without it being very unstable and likely to fall off. One solution is to install a shelf above the monitor and place the camera on the shelf. However, that may mean the system cannot be moved around and may need to be permanently installed close to a wall (needed to mount the shelf).

SUMMARY OF THE INVENTION

In various embodiments, a High Definition (HD) camera may have a lens portion and a base portion coupled to each other through one or more arm portions. The HD camera may be controlled by one or more motors in the HD camera's base. A tilt motor in the HD camera base may control the tilt of the HD camera, while a pan motor in the HD camera base may pan the HD camera. The tilt and pan motors may be coupled to plates in the base of the HD camera. The tilt motor may also be coupled to cables in an arm portion of the HD camera.

Putting the motors in the base may reduce the size of the outer case of the HD camera and add stability. In some embodiments, images from the HD camera may be converted into a serialized digital stream and transported over a data cable from the lens through a center shaft of the HD camera. This may allow the placement of several components for processing images, etc. in a base of the camera instead of in the lens portion. Other information may also be sent over the data cable (e.g., bi-directional control data and power). Other components in the lens portion and/or base portion may also be used to increase the functionality of the HD camera.

In various embodiments, cables and other components may be used to manipulate the camera lens through the side arms of the HD camera. Putting the motors in the base may reduce the size of the outer case of the HD camera and add stability. In some embodiments, images from the HD camera may be converted into a serialized stream and transported over a cable from the lens through a center shaft of the HD camera. Other components may also be used to increase the functionality of the HD camera.

In various embodiments, a camera support mechanism (CSM) may be used to couple a camera to a display. In some embodiments, the CSM may have a flat top that folds open to access a tripod mount screw that couples the camera to the CSM. After attaching the camera to the top of the CSM, the CSM may be placed on the top center of the display device. The CSM may have an adjustable front lip that aligns to the top front edge of the display device. In some embodiments, the front lip may be attached to a lower deck through a mount screw. The front lip may have two separate offsets that may cushion the contact with the display. In some embodiments, if multiple pads are used, the CSM may work with display devices that have either a concave or a convex front surface. The front lip may be adjusted to one of a number of set positions so that the CSM can accommodate even extremely thin screens that may be wall mounted.

In some embodiments, when the CSM is placed on the display, a user may tighten an adjustment knob on one side of the pivot point at the rear of the CSM. This may rotate the adjustable rear leg towards the back of the display. In some embodiments, the rear leg may rotate from flat and parallel to the top of the display to perpendicular to the top of the display. When the rear leg has rotated to the point where it makes contact with the display, further tightening of the knobs may apply additional pressure. The rear leg may be tightened to lock the rear leg firmly against the back of the display at that position. In some embodiments, the rear leg may have a foam/rubber tip for better gripping. In some embodiments, the CSM may also accommodate variable slope on the screen from front to back using the foam/rubber tip.

BRIEF DESCRIPTION OF THE DRAWINGS

A better understanding of the present invention may be obtained when the following detailed description is considered in conjunction with the following drawings, in which.

Figure 1:
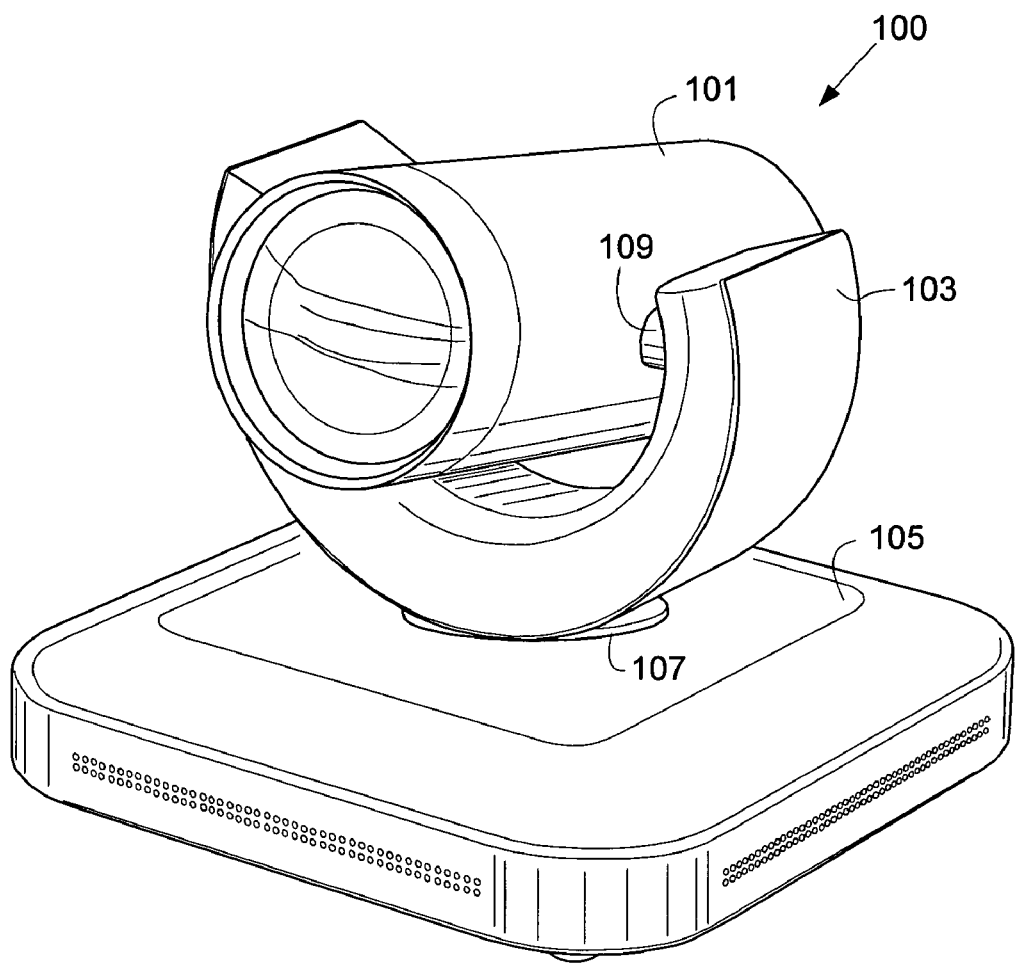
FIG. 1 illustrates a high density (HD) pan, tilt, zoom (PTZ) camera, according to an embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Provisional Patent Application titled "Speakerphone", Ser. No. 60/619,303, which was filed Oct. 15, 2004, whose inventors are Michael L. Kenoyer, William V. Oxford, and Simon Dudley is hereby incorporated by reference in its entirety as though fully and completely set forth herein.

U.S. Provisional Patent Application titled "Speakerphone", Ser. No. 60/634,315 which was filed Dec. 8, 2004, whose inventors are William V. Oxford, Michael L. Kenoyer and Simon Dudley which is hereby incorporated by reference in its entirety as though fully and completely set forth herein.

U.S. Provisional Patent Application titled "Video Conferencing Speakerphone", Ser. No. 60/619,212, which was filed Oct. 15, 2004, whose inventors are Michael L. Kenoyer, Craig B. Malloy, and Wayne E. Mock is hereby incorporated by reference in its entirety as though fully and completely set forth herein.

U.S. Provisional Patent Application titled "Video Conference Call System", Ser. No. 60/619,210, which was filed Oct. 15, 2004, whose inventors are Michael J. Burkett, Ashish Goyal, Michael V. Jenkins, Michael L. Kenoyer, Craig B. Malloy, and Jonathan W. Tracey is hereby incorporated by reference in its entirety as though fully and completely set forth herein.

HD PTZ Camera with Embedded Microphones; Thin Cable for Data and Power

FIG. 1 illustrates a high definition (HD) pan, tilt, zoom (PTZ) camera, according to an embodiment. In some embodiments, the HD PTZ camera 100 may be used to provide video of participants during a video conference call. In some embodiments, the camera may be a companion HiDef pan-tilt-zoom camera with a resolution of 1280×820 at 30 frames per second (fps). Other cameras, resolutions, and frame rates are also contemplated.

In some embodiments, the HD PTZ camera 100 may have a lens portion 101 coupled to a base 105 by one or more arm portions (e.g., camera bracket arms 103). In some embodiments, the lens portion 101 may be panned and/or tilted by motors (i.e., a device that converts one or more forms of energy into mechanical energy) in the base 105. The lens portion 101 may be pointed towards a participant or another source of visual interest. In some embodiments, the lens portion 101 may be panned by a motor turning the base shaft 107. In some embodiments, the lens portion 101 may be tilted by a motor turning a rod 109. In some embodiments, the pan motor and the tilt motor may be in the base of the HD PTZ camera 100. Other locations of the pan and tilt motors are also contemplated. In some embodiments, one motor may be used for panning and tilting the HD PTZ camera 100. In some embodiments, multiple motors may be used for panning and/or tilting the HD PTZ camera. In some embodiments, an electromechanical motor may be used. The motors may be step motors. Other motors are also contemplated.

In some embodiments, multiple motors in the camera base may be used together to pan and tilt the camera 100. For example, an Field Programmable Gate Array (FPGA) (e.g., see FPGA 321 in FIG. 3) in the camera 100 may receive a serial command (e.g., from a video conferencing system codec) to move the camera 100. The FPGA 321 may calculate a response to send to each motor in the base to move the camera to the requested position. The FPGA 321 may store or have access to a memory medium storing the position of the camera and/or motors. In some embodiments, the response may be a stepping wave that includes an acceleration phase, a constant move phase, and a deceleration phase. Other response patterns are also contemplated (e.g., the response may be a straight response for the motor to move at a predefined speed to a designated position). The FPGA 321 may receive other types of serial commands. For example, the FPGA 321 may be requested to move the camera to a preset position, to pan/tilt the camera at a specified speed, to move the camera to a specified position as fast as possible, to continue moving the camera until a command is received to stop, etc. The FPGA 321 may translate these commands into a response to send to each motor (or a subset of motors) in the camera 100.

Figure 2:
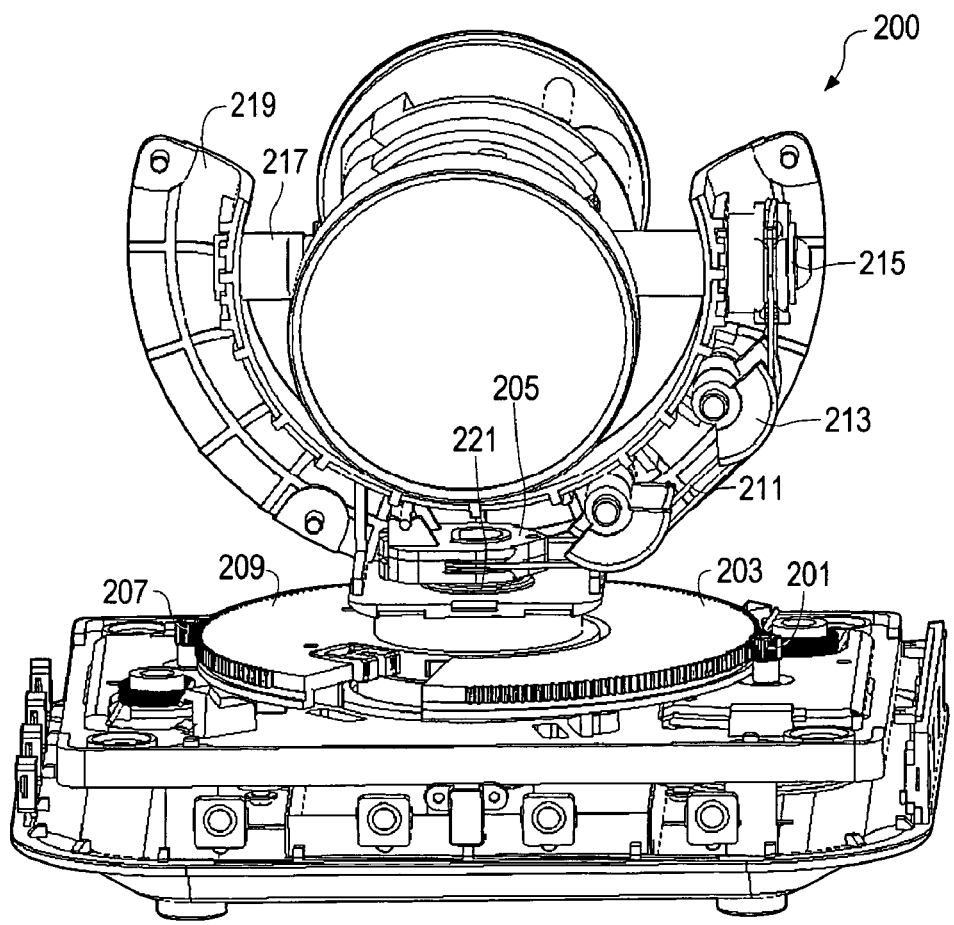
FIG. 2 illustrates a cutaway view of a HD PTZ camera, according to an embodiment.

FIG. 2 illustrates a cutaway view of a HD PTZ camera 100, according to an embodiment. Pan motor 201 and tilt motor 207 may substantially control movement of the HD PTZ camera 100. In some embodiments, the pan motor 201 and/or tilt motor 207 may be in the base of the HD PTZ camera 100. Putting the motors in the base may reduce the size of the outer case of the HD PTZ camera 100 and add stability. Pan motor 201 may rotate a first plate 203 that may pan the HD PTZ camera 100 to the left or right. In some embodiments, the pan motor 201 may turn a gear with teeth that interlock with teeth on the plate 203 to rotate the HD PTZ camera 100 through a range of motion (e.g., 180 degrees) left to right. In some embodiments, a larger or smaller range of motion may be implemented. Other sizes of plates 203 may also be used. For example, a larger plate may allow a larger range of motion.

In some embodiments, a tilt motor 207 may turn a second plate 209 using a gear with teeth that interlock with teeth on the second plate 209. The second plate 209 may turn a cable wheel 205 that may pull cable 211 in to the left or right (depending on which way the plate 209 is rotated). The cable 211 may rotate a tilt wheel 215 that may turn a rod 109 to tilt the HD PTZ camera 100 in the up and down direction. Offsetting connectors 213 with grooves for the cable 211 may hold the cable 211 away from the side of the interior of the HD PTZ camera 100 while also allowing the cable 211 to move back and forth along the interior of the HD PTZ camera bracket arm 219. While two sets of offsetting connectors 213 are shown, other numbers of offsetting connectors 213 may also be used.

In some embodiments, the motors 201 and 207 may be fixed. In some embodiments, the motors may be on moving parts within the camera 100. In some embodiments, the FPGA 321 may determine appropriate responses for the motors based on their current positions and the effect on their positions caused by the movement of other motors being controlled by the FPGA 321 (e.g., the motion of a motor caused by another motor's actions).

Figure 3:
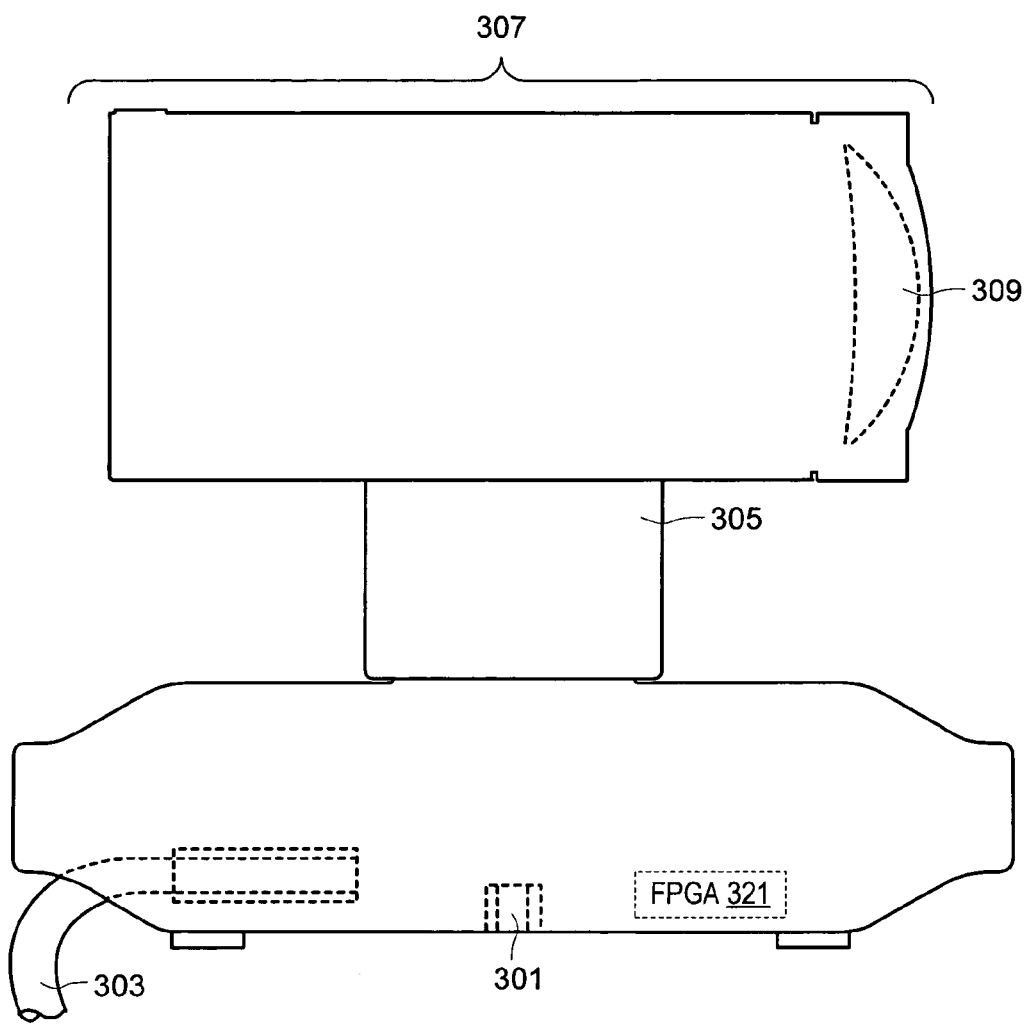
FIG. 3 illustrates a side view of the internal components of the HD PTZ camera, according to an embodiment.

FIG. 3 illustrates a side view of the internal components of the HD PTZ camera 100, according to an embodiment. In some embodiments, a screw hole 301 for a tripod mount screw may be provided. The HD PTZ camera 100 may attach to a mount through the tripod mount screw (other fasteners are also contemplated). In some embodiments, the HD PTZ camera 100 may use a wide angle lens 309 to capture an image of a participant even at a close angle. A data cable 303 may provide a link for data to and from the HD PTZ camera 100. In some embodiments, the data cable 303 may curve downward without going past the back of the camera (e.g., to make the camera 100 easier to mount against a wall or other flat surface). FPGA 321 is shown in the base of the camera 100. The FPGA 321 may be located in other areas of the base. In some embodiments, the FPGA 321 may be located in the lens portion of the camera 100. Other placements of the FPGA are also contemplated. In some embodiments, the signal from the HD PTZ camera 100 may be digitized before being sent down the data cable 303 in a high speed serial digital stream. Other data types and conversions are also contemplated. For example, an industry standard electrical (Low Voltage Differential Signaling (LVDS)) and/or mechanical (e.g., Firewire/IEEE1394) interface may be used. In some embodiments, the data cable 303 may be thin and flexible. The data cable 303 may provide a digital interface to the HD PTZ camera 100 with, for example, six wires from the HD PTZ camera 100 to the HD PTZ camera base. Other numbers of wires may also be used. In some embodiments, the data cable 303 may form a high speed digital bus for carrying digitized microphone data, digital image data, bi-directional control data for controlling pan, tilt, focus, zoom motors, iris motors, and/or power to the HD PTZ camera 100. In some embodiments, the data cable 303 may be up to 50 feet long. Other lengths are also contemplated. In some embodiments, the data cable 303 may run up one of the arms 305 of the HD PTZ camera 100 to the central components of the lens portion 307. In some embodiments, the data cable 303 may run up the other arm 305 that does not contain the tilt cable 211.

Figure 4:
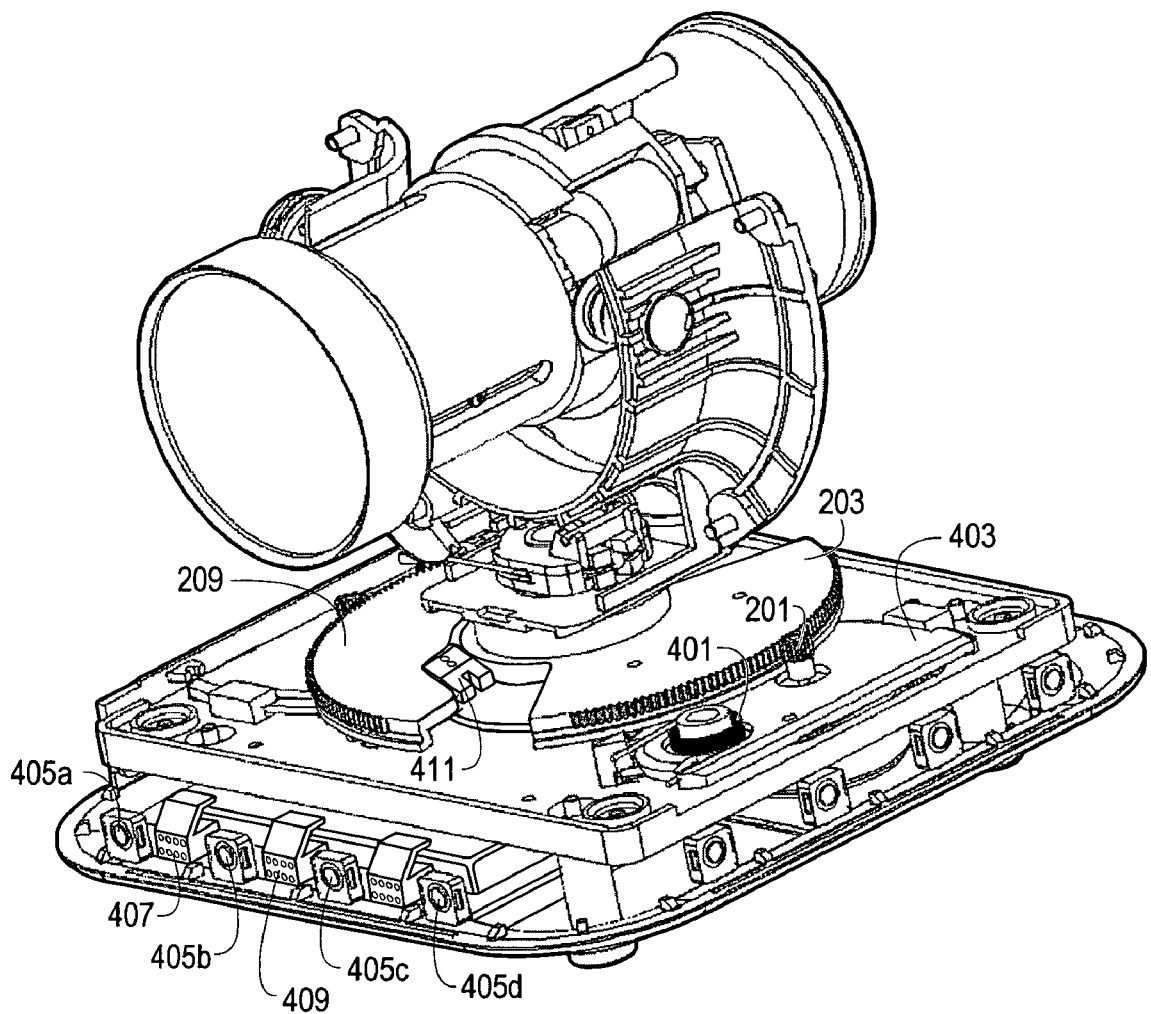
FIG. 4 illustrates another view of the internal components of the HD PTZ camera, according to an embodiment.

FIG. 4 illustrates another view of the internal components of the HD PTZ camera 100, according to an embodiment. In some embodiments, an opto-interrupter on the gear plate 203 may be used to stop panning or tilting of the HD PTZ camera 100 if the HD PTZ camera 100 is panned or tilted past a predefined point. In some embodiments, additional opto-interrupters (e.g., 411) may be put on the other gear plate 209. In some embodiments, the opto-interrupters may be put on both sides of each gear plate to detect when the HD PTZ camera 100 was rotated or tilted past each end of a predefined point. In some embodiments, a spring 401 may bias the motor support plate 403 toward the center of the HD PTZ camera 100. This bias may keep the motor gear 201 in contact with the gear plate 203.

In various embodiments, an array of microphones 405 may be used to point the HD PTZ camera 100 in the direction of a speaking participant. The signals from the microphones 405 may be beamformed to determine the direction of arrival. The HD PTZ camera 100 may then be aimed at a participant or another source of audio. In some embodiments, eight low noise microphones 405 may be integrated into the HD PTZ camera 100. Other numbers of microphones and other microphone array orientations may be used. In some embodiments, the HD PTZ camera 100 may not have microphones (e.g., it may be steered by a user). Digitized microphone data may be sent down the data cable 303.

In some embodiments, the location or angle of a participant relative to the HD PTZ camera 100 may be determined by beamforming data from the microphones 405. The microphone positions relative to the HD PTZ camera 100, along with the angle and zoom of the HD PTZ camera 100 may be known. The microphone positions, camera angle, and camera zoom may then be used in conjunction with the data from the microphones 405 to determine the angle of the participant relative to the true visual field of the HD PTZ camera 100. In some embodiments, the spatial positioning of the participant relative to the visual field may be determined and the HD PTZ camera 100 may be steered/aimed to center on the participant (or may be steered to another predetermined angle and zoom relative to the participant).

In some embodiments, a remote control sensor 407 may be provided. In some embodiments, multiple remote control sensors may be provided to make it easier for the HD PTZ camera 100 to receive signals from a remote control. In some embodiments, the HD PTZ camera 100 may receive signals through the remote control sensor 407 from an integrated unit and/or codec managing a video conference call. Additional connectors may also be provided. For example, light-pipe 409 may be provided (e.g., for a light emitting diode (LED) on a circuit board behind the light-pipe 409). The LED may be used to indicate when a signal is received from the remote control or may be illuminated when the HD PTZ camera 100 is powered. Other uses for the LED are also contemplated.

Camera Support Mechanism

Figure 5:
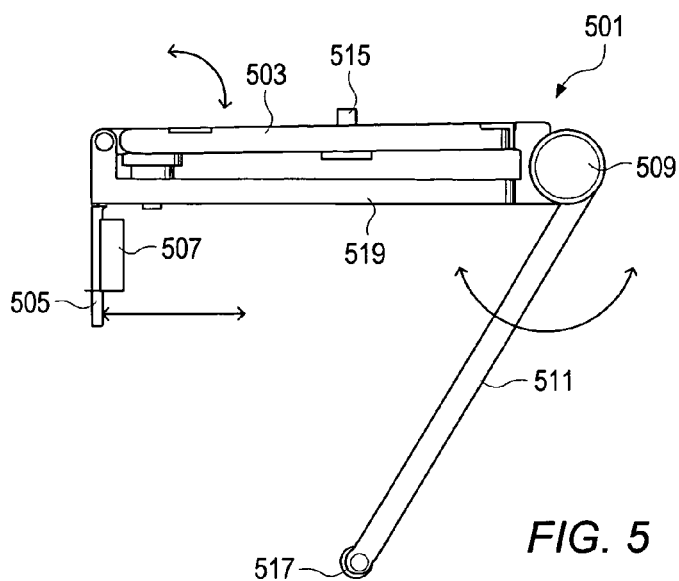
FIG. 5 illustrates a side view of the camera support mechanism, according to an embodiment.
Figure 6:
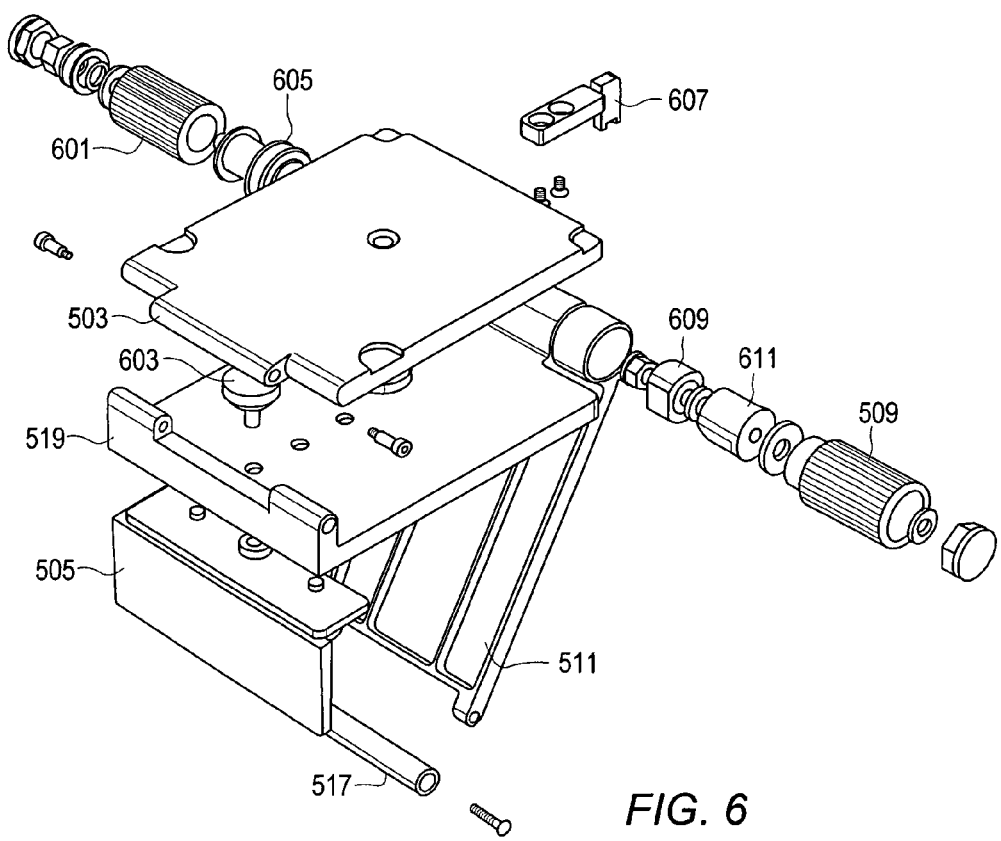
FIG. 6 illustrates an exploded view of the camera support mechanism, according to an embodiment.

As seen in FIGS. 5 and 6, in various embodiments, a camera support mechanism (CSM) 501 may be used to mount a camera on top of a television (TV) or display device. The CSM 501 and camera may be installed on top of a monitor very quickly (e.g., in less than 1 minute). Other installation times are also contemplated. The CSM 501 may work for a video conferencing pan-tilt-zoom camera, or may be used for mounting any object on top of another object with a variable shape and thickness. This could be adapted for example to place a Digital Versatile Disc (DVD) player and/or a satellite receiver on top of the TV.

In various embodiments, the CSM 501 may have an upper deck 503 (which may be flat) that folds open to access a tripod mount screw 515 that couples the camera to the CSM 501. Other fasteners may also be used to couple the camera to the CSM 501. In some embodiments, the CSM may not have a flat top that folds open. After attaching the camera to the top of the CSM 501, the CSM 501 may be placed on the top center of the display device. The CSM 501 may have an adjustable front lip 505 (adjustable in an approximate range of plus or minus 5 degrees) that aligns to the top front edge of the display device. Other adjustment ranges are also contemplated. This may compensate for any "droop" of the lower deck when the CSM 501 is mounted to a display. (The camera lens may pan tilt in a range of approximately +/−25 degrees. Other camera tilt ranges are also contemplated.) In some embodiments, the front lip 505 may be attached to a lower deck 519 through a mount screw 603. Other fasteners between the front lip 505 and the lower deck 519 are also contemplated. The front lip 505 may have two separate offsets (e.g., foam rubber pads 507) that may cushion the contact with the display. Other numbers, shapes, and materials for the offsets are also contemplated. In some embodiments, if multiple pads 507 are used, the CSM 501 may work with display devices that have either a concave or a convex front surface. In some embodiments, the CSM 501 may work with display devices that have either a concave or a convex surface if a single pad is used. The front lip 505 may be adjusted to one of a number of set positions so that the CSM 501 can accommodate even extremely thin screens that may be wall mounted. For thin display devices mounted to a wall, the CSM 501 and camera may actually extend a couple of inches in front of the display in order for the back of the CSM 501 to not hit the wall.

In some embodiments, when the CSM 501 is placed on the display, a user may tighten adjustment knob 509 on one side of the pivot point at the rear of the CSM 501. In some embodiments, the adjustment knob 509 may be a large knurled plastic knob. Other materials and shapes are also contemplated. This may rotate the adjustable rear leg 511 towards the back of the display. In some embodiments, the rear leg 511 may rotate from flat and parallel to the top of the display to perpendicular to the top of the display. In some embodiments, the rear leg 511 may accommodate different monitors or TVs (e.g., monitor based displays, rear-projection displays LCD displays, and plasma screens). When the rear leg 511 has rotated to the point where it makes contact with the display, further tightening of the knobs 509 may apply additional pressure. The rear leg 511 may be tightened to lock the rear leg 511 firmly against the back of the display at that position. In some embodiments, the lower deck face gear 609 and leg face gear 611 may be used to move and/or tighten the rear leg 511. In some embodiments, the two face gears 609,611 may disengage to allow the rear leg 511 to swing against the back of the display. Then the face gears 609,611 may engage to lock the rear leg 511 in one position. In some embodiments, conical mating surfaces may be used in place of face gears 609, 611. For example, conical mating surfaces (similar to a conical clutch) may be used to allow continuous stopping positions for the rear leg 511. In some embodiments, discrete stopping distances may be used. In some embodiments, the rear leg 511 may have a foam/rubber tip 517 for better gripping. In some embodiments, the CSM 501 may also accommodate variable slope on the screen from front to back using the foam/rubber tip 517.

Figure 7:
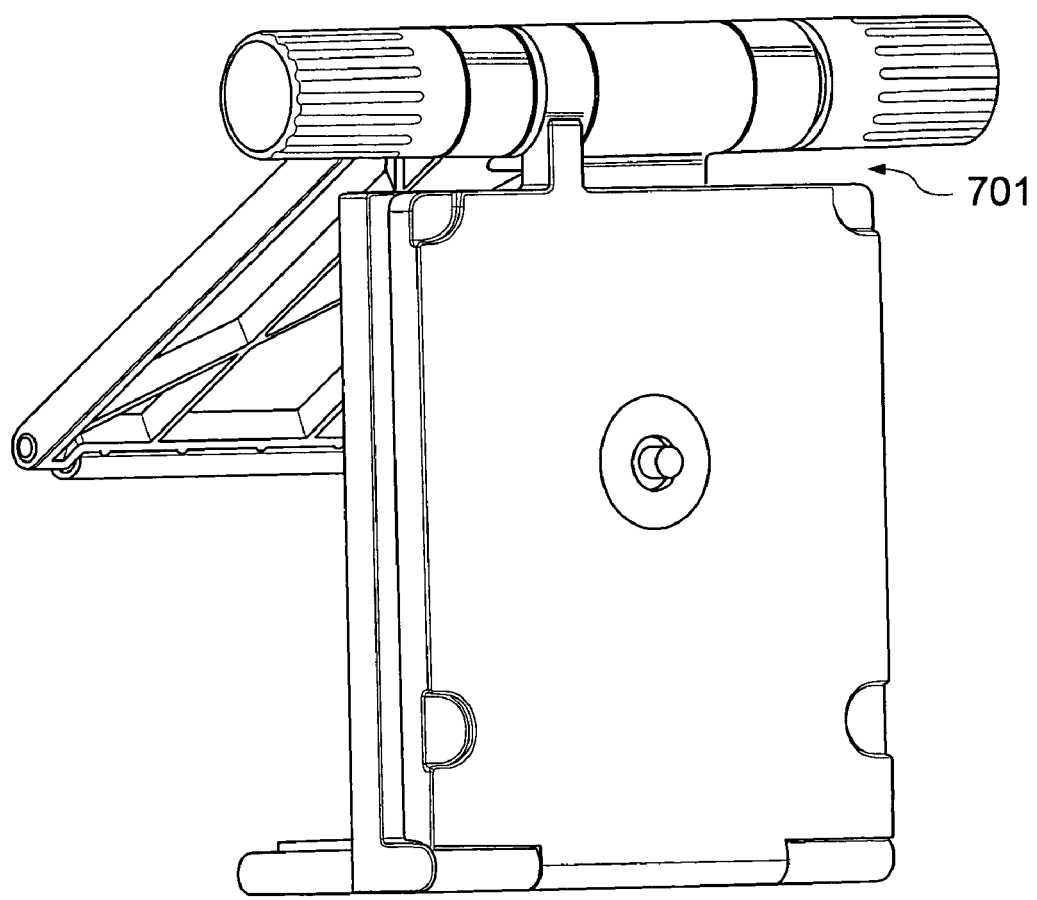
FIG. 7 illustrates a top view of the camera support mechanism with a cable slot, according to an embodiment.

In some embodiments, with the CSM 501 firmly attached to the display, the camera may be relatively flat but may not be perfectly lined up with the top of the display device resulting in a tilt offset. By turning the lifter knob 601 (as seen in FIG. 6) on the CSM 501, the angle of the camera can be adjusted up or down approximately in a range of plus or minus 10 degrees (other ranges are also contemplated). In some embodiments, the lifter knob 601 may be made of knurled plastic. Other materials and shapes are also contemplated. In some embodiments, the lifter cam 605 may adjust the angle of the camera as the lifter knob 601 is turned. The back of the CSM 501 may have a slot 701 (as seen in FIG. 7) in front of the adjustment knobs that may be used to route the camera cable without increasing the overall depth. Other locations for the slot 701 are also contemplated. In some embodiments, the electronics from the camera in the video conferencing system may be split in order to use a smaller mount for fitting the camera on top of the display device. In some embodiments, a cam follower arm 609 may be used to tilt the upper deck 503 approximately in a range of plus or minus 5 degrees (other ranges are also contemplated).

Figure 8:
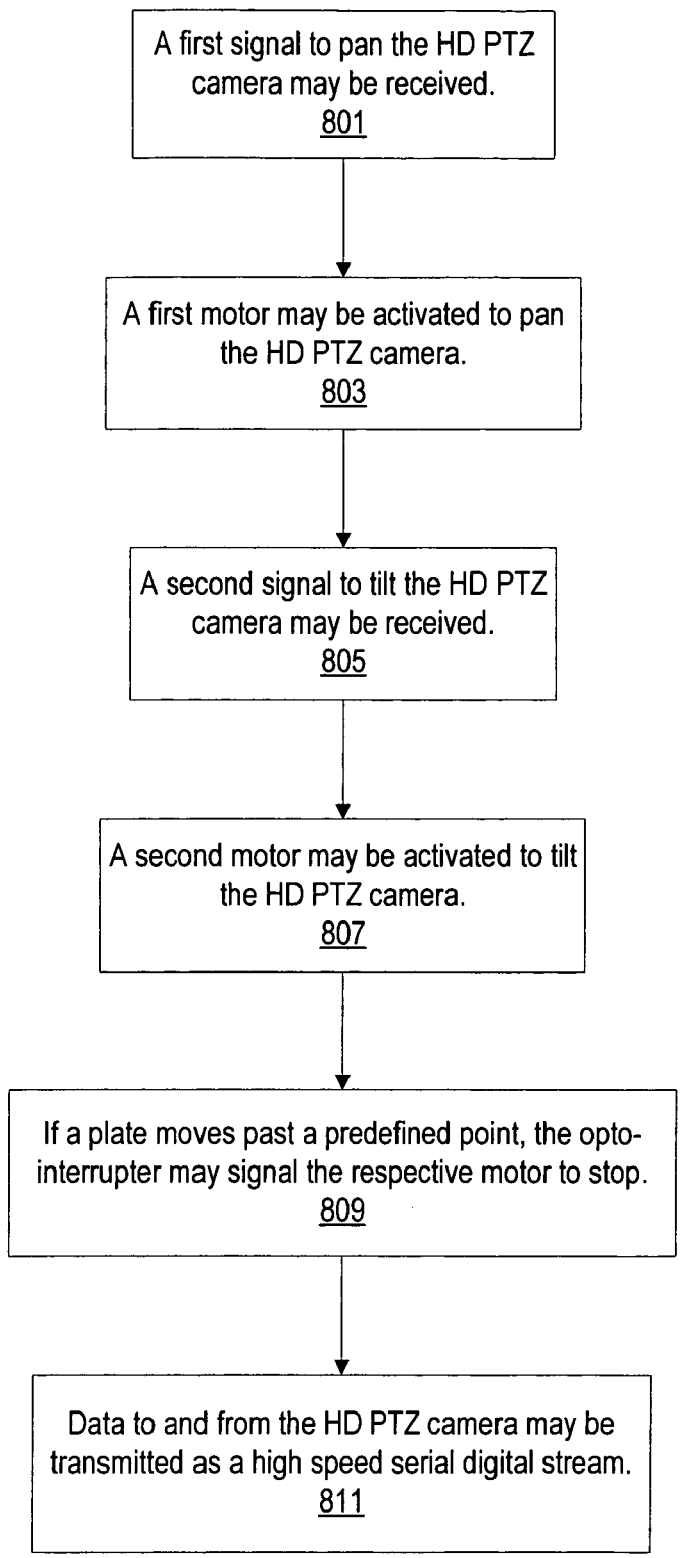
FIG. 8 illustrates a method of positioning an HD PTZ camera, according to an embodiment.

FIG. 8 illustrates a method of positioning an HD PTZ camera 100, according to an embodiment. It is noted that in various embodiments one or more of the method elements may be performed concurrently, in a different order, or be omitted. Additional elements may be performed as desired.

At 801, a first signal to pan the HD PTZ camera 100 may be received. For example, the first signal may be received by an FPGA 321.

At 803, a first motor (e.g., pan motor 201) may be activated to pan the HD PTZ camera 100. In some embodiments, the first motor may pan the HD PTZ camera 100 through rotation of a first plate 203 coupled to the HD PTZ camera 100.

At 805, a second signal to tilt the HD PTZ camera 100 may be received. For example, the second signal may be received by an FPGA 321.

At 807, a second motor (e.g., tilt motor 207) may be activated to tilt the HD PTZ camera 100. In some embodiments, the second motor may tilt the HD PTZ camera 100 through rotation of a second plate 209 coupled to the HD PTZ camera 100 through cables in an arm of the HD PTZ camera 100.

In some embodiments, the FPGA 321 may determine appropriate responses for activating the motors based on their current positions and the effect on their positions caused by the movement of other motors being controlled by the FPGA 321 (e.g., the motion of a motor caused by another motor's actions). The FPGA 321 may determine appropriate responses for activating the motors in the camera to control the motors at 803 and 807 based on the received first and second signals. In some embodiments, the motors may be activated by the FPGA 321 substantially simultaneously. In some embodiments, the motors may be activated at different times.

At 809, if the first plate 203 or the second plate 209 moves past a predefined point (as detected by an opto-interrupter), the opto-interrupter 411 may signal the first motor or the second motor, respectively, to stop.

At 811, data to and from the HD PTZ camera 100 may be transmitted as a high speed serial digital stream through a thin cable coupled to the HD PTZ camera 100.

Embodiments of these methods may be implemented by program instructions stored in a memory medium or carrier medium. A memory medium may include any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, the computer system may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus, comprising:
  a high definition (HD) camera, comprising:
  a lens portion;
    a base coupled to the lens portion;
    a first motor;
    a second motor;
    a first plate engaged by the first motor to pan the lens portion; and
    a second plate engaged by the second motor to tilt the lens portion;
    wherein the first plate and the second plate are substantially coplanar with each other and wherein the first plate and the second plate are substantially parallel with an exterior bottom surface of the base.

2. The apparatus of claim 1, further comprising:
  a thin cable coupled to the HD camera, wherein the thin cable transmits a high speed serial digital stream.

3. The apparatus of claim 2, wherein the thin cable carries digitized microphone data and digital image data.

4. The apparatus of claim 2, wherein the thin cable carries bi-directional control data for controlling the first motor, the second motor, focus motor, zoom motor, iris motor, or power to the HD camera.

5. The apparatus of claim 1, further comprising an opto-interrupter on at least one of the first plate and the second plate, wherein the opto-interrupter detects motion of the at least first plate or second plate past a predefined point.

6. The apparatus of claim 5, wherein if the opto-interrupter detects motion past the predefined point, the opto-interrupter signals the first motor or second motor, corresponding to the plate the opto-interrupter is coupled, to stop.

7. The apparatus of claim 1, further comprising a remote control sensor coupled to the HD camera.

8. The apparatus of claim 1, further comprising a field programmable gate array (FPGA) configured to control the first motor or the second motor in the base of the HD camera.

9. The apparatus of claim 1, further comprising:
  an arm assembly coupling the base to the lens portion, wherein the arm assembly comprises one or more arms, wherein the lens portion is coupled to at least one of the one or more arms through a rod; and
  a tilt cable coupling the second plate and the rod, wherein rotation of the second plate pulls the tilt cable to rotate the rod to tilt the lens portion.

10. The apparatus of claim 9, wherein the tilt cable runs through an interior of the at least one of the one or more arms and is spaced from a side of the interior of the at least one of the one or more arms through at least one offsetting connector operable to pivot to allow movement of the tilt cable in the interior of the at least one of the one or more arms.

11. The apparatus of claim 1, wherein the first motor and the second motor are in the base of the HD camera.

12. The apparatus of claim 1, further comprising:
  an array of microphones coupled to the HD camera, wherein signals from the array of microphones may be beamformed to detect a direction to a sound source.

13. The apparatus of claim 1, wherein a field programmable gate array (FPGA) in the HD camera receives the first and second signal and controls the first motor and the second motor.

14. The apparatus of claim 1,
  wherein the first plate comprises:
    a first planar surface substantially perpendicular to an axis of rotation of the first plate; and
    a first side surface configured to engage a gear coupled to the first motor;
  wherein the second plate comprises:
    a second planar surface substantially perpendicular to an axis of rotation of the second plate; and
    a second side surface configured to engage a gear coupled to the second motor;
  wherein the first planar surface and the second planar surface are substantially coplanar with each other and substantially parallel with an exterior bottom surface of the base.

15. A high definition (HD) camera, comprising:
  a lens portion;
  a base coupled to the lens portion, wherein the base comprises one or more motors, wherein the one or more motors are operable to pan the lens portion and tilt the lens portion;
  a plate configured to engage at least one of the one or more motors;
  an arm assembly coupling the base to the lens portion, wherein the arm assembly comprises one or more arms, wherein the lens portion is coupled to at least one of the one or more arms through a rod; and
  a tilt cable coupling the plate and the rod, wherein rotation of the plate pulls the tilt cable to rotate the rod to tilt the lens portion;
  wherein the tilt cable extends through an interior of the at least one of the one or more arms and is spaced from a side of the interior of the at least one of the one or more arms through at least one offsetting connector to allow movement of the tilt cable in the interior of the at least one of the one or more arms.

16. The HD camera of claim 15, wherein the one or more arms comprise a first arm and a second arm, wherein both the first arm and the second arm extend approximately to a midpoint of opposing sides of the lens portion and wherein the first arm and the second arm are coupled to the lens portion through the rod, wherein the rod is coupled to the side of the lens portion at approximately the midpoints of the side of the lens portion.

17. The HD camera of claim 15, wherein the at least one offsetting connector is operable to pivot to allow the movement of the tilt cable in the interior of the at least one of the one or more arms.

* * * * *